US008967955B2

(12) United States Patent
Barthelet et al.

(10) Patent No.: US 8,967,955 B2
(45) Date of Patent: Mar. 3, 2015

(54) TURBOCHARGER WITH VARIABLE NOZZLE HAVING LABYRINTH SEAL FOR VANES

(75) Inventors: Pierre Barthelet, Thaon les Vosges (FR); Emmanuel Severin, Thaon les Vosges (FR); Nicolas Morand, Vosges (FR); Denis Jeckel, Epinal (FR); Dominique Petitjean, Julienrupt (FR); Philippe Arnold, Hennecourt (FR); Karl-Heinz Bauer, La Rippe (CH)

(73) Assignee: Honeywell International Inc., Morristown, NJ (US)

( * ) Notice: Subject to any disclaimer, the term of this patent is extended or adjusted under 35 U.S.C. 154(b) by 828 days.

(21) Appl. No.: 13/245,218

(22) Filed: Sep. 26, 2011

(65) Prior Publication Data

US 2013/0078083 A1    Mar. 28, 2013

(51) Int. Cl.
| | | |
|---|---|---|
| *F01B 25/02* | (2006.01) | |
| *F01D 17/12* | (2006.01) | |
| *F01D 11/02* | (2006.01) | |
| *F02C 6/12* | (2006.01) | |
| *F01D 17/16* | (2006.01) | |

(52) U.S. Cl.
CPC . *F01D 11/02* (2013.01); *F02C 6/12* (2013.01); *F01D 17/165* (2013.01); *F05D 2220/40* (2013.01)
USPC .......................................... 415/158; 415/166

(58) Field of Classification Search
USPC ......... 415/148, 151, 157, 158, 160, 165, 166, 415/167, 183, 184, 185, 191, 203, 204, 206, 415/210.1
See application file for complete search history.

(56) References Cited

U.S. PATENT DOCUMENTS

| | | | | | |
|---|---|---|---|---|---|
| 4,973,223 | A | * | 11/1990 | Franklin | 415/157 |
| 6,575,693 | B2 | * | 6/2003 | Pross et al. | 415/1 |
| 7,114,919 | B2 | * | 10/2006 | Scholz et al. | 415/164 |
| 8,021,107 | B2 | * | 9/2011 | Espasa et al. | 415/160 |
| 8,668,443 | B2 | * | 3/2014 | Espasa et al. | 415/160 |
| 2008/0240906 | A1 | * | 10/2008 | Barthelet et al. | 415/148 |
| 2011/0206500 | A1 | * | 8/2011 | Nagao et al. | 415/148 |

FOREIGN PATENT DOCUMENTS

WO    WO 2004/027218 A1    4/2004

* cited by examiner

*Primary Examiner* — Edward Look
*Assistant Examiner* — Christopher J Hargitt
(74) *Attorney, Agent, or Firm* — John C. James

(57) ABSTRACT

A variable nozzle for a turbocharger includes a plurality of vanes rotatably mounted on a nozzle ring and disposed in a nozzle flow path defined between the nozzle ring and an opposite nozzle wall. Either or both of the faces of the nozzle ring and nozzle wall include(s) grooves extending substantially transverse to a general flow direction of the flow through the nozzle, and there are clearances between the ends of the vanes and the adjacent faces. Leakage flow through the clearance between the end of each vane and the adjacent face having the grooves must proceed across the grooves, and thus a labyrinthine flow passage is presented to the leakage flow. The labyrinthine passage has a greater resistance to flow than would be the case without the grooves. Accordingly, leakage flow is reduced, which is beneficial to turbine efficiency.

9 Claims, 7 Drawing Sheets

TURBOCHARGER WITH VARIABLE NOZZLE HAVING LABYRINTH SEAL FOR VANES

BACKGROUND OF THE INVENTION

The present disclosure relates generally to turbochargers, and relates more particularly to exhaust gas-driven turbochargers having a variable turbine nozzle in the form of an array of vanes that are pivotable about their axes between a closed position and an open position, and any position therebetween, for regulating the flow of exhaust gas through the nozzle to the turbine wheel.

In a typical turbocharger as described above, the vanes are rotatably mounted on a generally annular nozzle ring disposed in the turbocharger surrounding a central axis about which the turbine wheel rotates. The vanes extend between the nozzle ring and an opposite wall defined by an insert disposed in the turbine housing. The nozzle flow path extends between the nozzle ring and the insert, and thus the exhaust gas flows from the turbine housing chamber, radially inwardly between the vanes, and into the turbine wheel. By pivoting the vanes, the effective flow area of the nozzle is varied, thereby regulating the flow of exhaust gas to the turbine wheel.

The vanes are typically mounted on the nozzle ring by way of axles affixed to one end of the vanes and received in bearing apertures that extend through the nozzle ring. The portions of the vanes exposed to exhaust gas flow in the nozzle are shaped as airfoils whose opposite ends are closely proximate to the faces of the nozzle ring and the opposite insert, respectively. Ideally, the clearance between each end of the airfoil portion and the adjacent face should be zero so that exhaust gas cannot leak through the clearance. However, in practice it is usually not possible to have zero clearance, or even a very small clearance, because binding would occur between the ends of the airfoil portion and the adjacent faces of the nozzle ring and insert. This is particularly true in view of the thermally induced deformations of the various parts that take place during turbocharger operation. The various parts undergo thermal growth and contraction at different rates and by different amounts.

Accordingly, in practice, the nominal vane clearances typically are designed to be relatively large so as to avoid any possibility of the vanes binding. While the clearances may be smaller at some operating conditions, by design there is still a considerable clearance over the entire expected range of operating conditions. These substantial clearances are known to cause a loss in turbine efficiency. However, it has generally been assumed that such efficiency loss is unavoidable because of the need to prevent any possibility of vane binding.

BRIEF SUMMARY OF THE DISCLOSURE

The present disclosure relates to a turbocharger having a variable nozzle designed to be essentially free of vane binding problems, yet enabling the clearance-induced efficiency loss to be substantially reduced.

In accordance with one aspect of the present disclosure, a turbocharger having a variable nozzle comprises a turbine wheel disposed within a turbine housing, the turbine housing defining an axially extending bore and a generally annular chamber surrounding the bore for receiving exhaust gas from an internal combustion engine. A generally annular nozzle ring is disposed in the turbocharger and defines a plurality of circumferentially spaced bearing apertures extending axially through an axially facing face of the nozzle ring. The nozzle ring is axially spaced from a nozzle wall defining a face opposing the face of the nozzle ring, the opposing faces of the nozzle ring and nozzle wall defining a nozzle flow path therebetween through which exhaust gas in the chamber is directed generally radially inwardly into the turbine wheel. A plurality of circumferentially spaced vanes are disposed in the nozzle flow path, each vane comprising an axle defining a pivot axis for the vane, the axles of the vanes being respectively received in the bearing apertures of the nozzle ring and being rotatable therein about the respective pivot axes such that the vanes are adjustable in setting angle between a closed position and an open position.

Each vane includes an aerodynamic airfoil portion having an outer airfoil surface, each airfoil portion being joined to the respective axle and extending along the pivot axis from a first end to an opposite second end. The first and second ends of each airfoil portion respectively define first and second end faces that are substantially perpendicular to the pivot axis. Clearances exist between the first end faces of the airfoil portions and the face of the nozzle ring and between the second end faces of the airfoil portions and the face of the nozzle wall. In accordance with the present disclosure, these clearances can be of a size designed to avoid binding of the vanes at all operating conditions of interest.

However, to reduce clearance-induced efficiency losses, at least the face of the nozzle ring (and, optionally, also the face of the opposite nozzle wall) includes a plurality of generally parallel spaced-apart grooves positioned proximate the respective end faces of the airfoil portions of the vanes. The length direction of the grooves is oriented generally transverse to the flow direction of the exhaust gas through the passages between the vanes of the variable nozzle. Accordingly, any flow leaking through the clearance between the end of a vane and the face having the grooves will flow generally transverse to the length direction of the grooves. The grooves and the adjacent end face of each vane thus together define a labyrinthine passage through which any leakage flow must pass. The labyrinthine passage presents a greater flow resistance than would be the case if the grooves were not present. Accordingly, for a given pressure differential across the vane airfoil, the labyrinthine passage will permit a smaller leakage flow rate than would be the case without the grooves. This reduction in leakage flow has a beneficial impact on turbine efficiency.

The grooves in the nozzle ring can be manufactured in various ways. For example, the face of the nozzle ring can be machined (e.g., by milling or grinding) to form the grooves. Alternatively, a stamping process, a fine blanking process, or an electro-erosion process can be used to form the grooves.

In one embodiment, the grooves are confined to a region of the face of the nozzle ring substantially coinciding with a radial extent of the vanes in the open position thereof.

In another embodiment, the grooves are confined to a region of the face of the nozzle ring substantially coinciding with a radial extent of the vanes in the closed position thereof.

In a further embodiment, the nozzle face is provided with a raised boss that substantially fills up the clearance between the nozzle face and the end faces of the vanes when the vanes are in the closed position, thereby substantially reducing or eliminating leakage flow in the closed position of the vanes. While the boss is not effective for reducing leakage flow in the open position of the vanes, the turbine efficiency penalty from leakage flow in the open position is not nearly as problematic as it is in the closed position.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
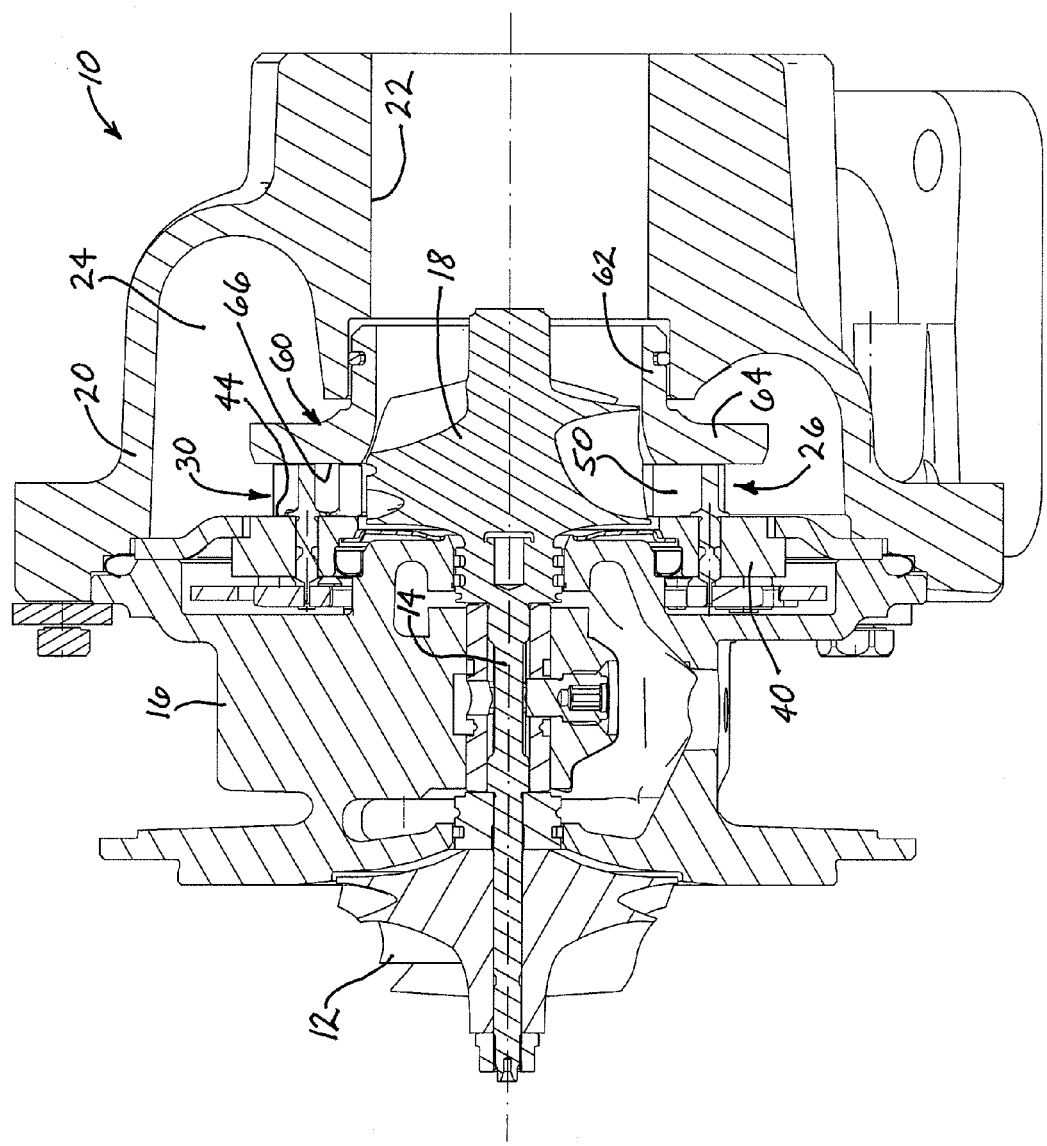
FIG. 1 is an axial cross-sectional view of a turbocharger in accordance with one embodiment of the invention.
Figure 2:
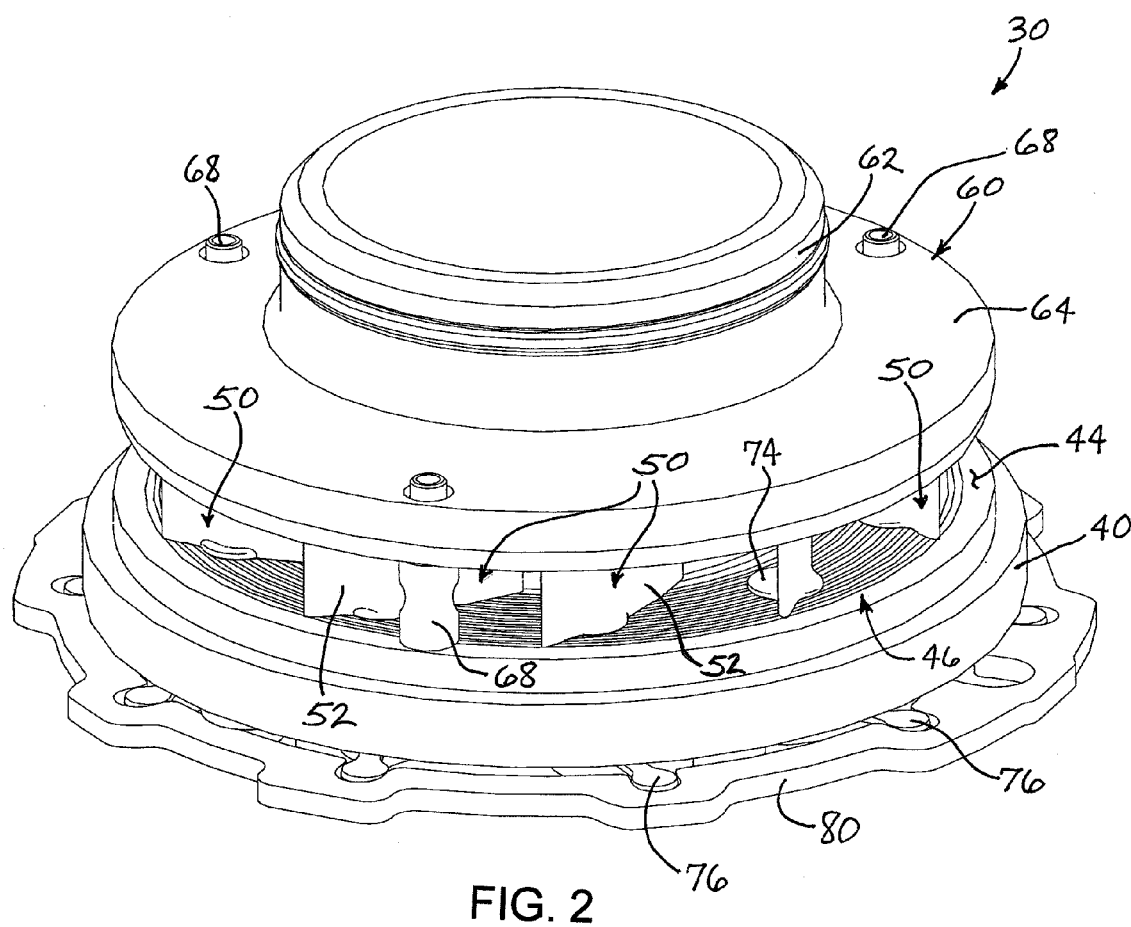
FIG. 2 is perspective view showing a variable nozzle in accordance with one embodiment of the invention.

FIG. 1 shows a turbocharger 10 in accordance with one embodiment of the invention. The turbocharger includes a compressor wheel 12 mounted on a shaft 14 that extends through a central bore in a center housing 16 and is affixed to a turbine wheel 18. The turbine wheel is mounted in a turbine housing 20. The turbine housing defines an axially extending bore 22 as well as a generally annular volute or chamber 24 that is radially outward of and surrounds the bore 22. The turbine housing also defines an inlet (not visible in FIG. 1) for admitting exhaust gas from an internal combustion engine into the chamber 24. The exhaust gas flows from the chamber radially inwardly through a nozzle 26 and impinges on and flows through the blade passages of the turbine wheel 18, thereby driving the turbine wheel, which in turn drives the compressor wheel 12. The turbocharger also includes a compressor housing (not shown) defining a volute for receiving the air pressurized by the compressor wheel, the pressurized air then being fed to the air intake system of the internal combustion engine.

The turbocharger includes a variable vane assembly, or variable nozzle, 30 by which the rate of exhaust gas flow through the nozzle can be regulated in order to regulate the amount of power produced by the turbine, and thus the amount of pressurization achieved by the compressor. The variable vane assembly includes a generally annular nozzle ring 40 disposed between the center housing 16 and turbine housing 20. The nozzle ring is substantially coaxial with the rotational axis of the shaft 14. The variable vane assembly further includes a plurality of vanes 50 rotatably mounted to the nozzle ring in a circumferentially spaced array. The vanes extend generally axially within the flow path of the nozzle 26, between the nozzle ring 40 and an opposite nozzle wall. In the illustrated embodiment, the opposite nozzle wall is defined by an insert 60 having a generally tubular portion 62 that is sealingly inserted into the bore 22 of the turbine housing, and having a nozzle portion 64 that extends radially outwardly from the upstream end of the tubular portion 62 and forms the opposite wall of the nozzle. However, in other embodiments, the opposite nozzle wall can be defined by a portion of the turbine housing. The nozzle ring 40 has a face 44 that is substantially planar and faces axially toward the opposite nozzle wall 64. The insert similarly has a face 66 that is substantially planar and faces axially toward the nozzle ring 40. Rigid spacers 68 couple the nozzle ring 40 to the insert 60.

Figure 4:
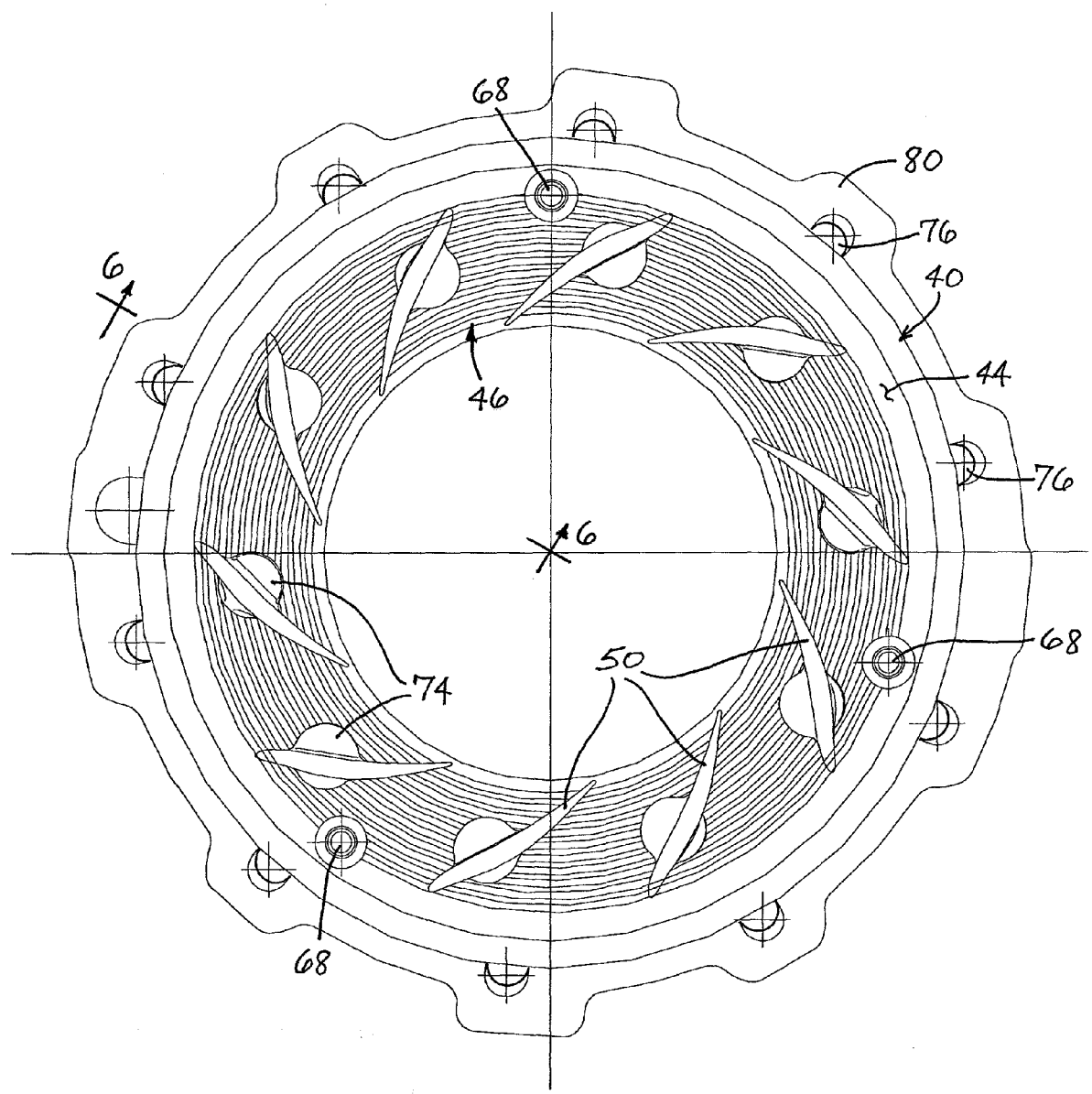
FIG. 4 is an elevation of the variable nozzle of FIG. 2 with the insert of the variable nozzle removed.
Figure 5:
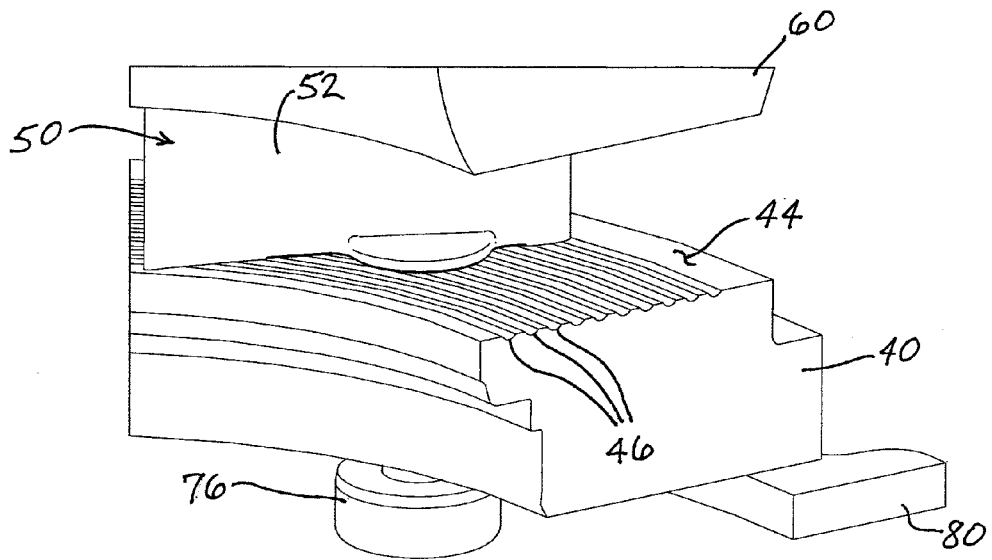
FIG. 5 is an enlarged portion of FIG. 3.
Figure 6:
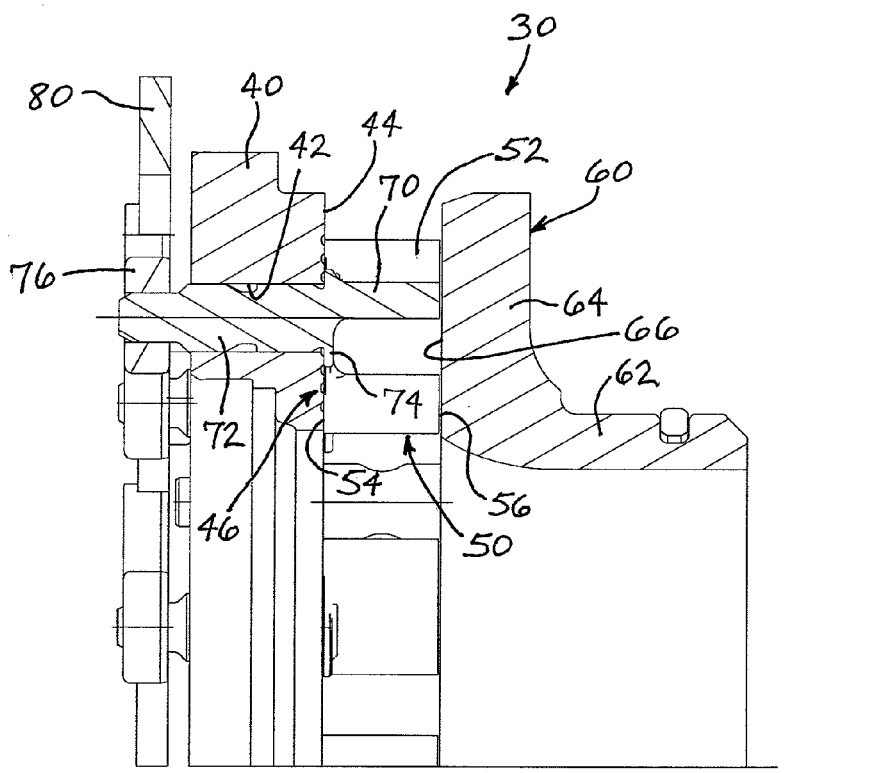
FIG. 6 is a cross-sectional view of the variable-nozzle assembly along line 6-6 in FIG. 4.

FIGS. 2 through 6 show the variable vane assembly 30 in greater detail. With particular reference to FIG. 6, each vane is rigidly mounted on an axle 70. Each axle has a portion 72 that extends through a cylindrical bearing aperture 42 in the nozzle ring. The axles 70 are rotatable within the bearing apertures 42 for varying the setting angles of the vanes 50. Each axle 70 also includes a bearing portion 74 of larger diameter than the rest of the axle, and having a substantially planar surface for bearing against the adjacent surface of the nozzle ring 40.

The portion 72 of each axle extending through the bearing aperture 42 in the nozzle ring 40 is rigidly affixed to a vane arm 76. The vane arms are engaged by a rotatable unison ring 80 such that rotation of the unison ring in one direction or the opposite direction causes the vane arms to pivot in one direction or the opposite direction, which in turn cause the vanes 50 to pivot in one direction or the opposite direction. A suitable actuator and linkage (not shown) is used for rotating the unison ring.

Each vane 50 includes an aerodynamic airfoil portion 52. Each airfoil portion is joined to the respective axle 70 and extends along the pivot axis defined by the axle, from a first end to an opposite second end. The first end of each airfoil portion 52 that is adjacent the nozzle ring 50 defines a first end face 54 (FIG. 6) that is substantially perpendicular to the pivot axis. The second end of each airfoil portion, adjacent the insert 60, defines a second end face 56 (FIG. 6) that is substantially perpendicular to the pivot axis.

Clearances exist between the first end faces 54 of the airfoil portions and the face 44 of the nozzle ring, and between the second end faces 56 of the airfoil portions and the face 66 of the insert or nozzle wall. It is necessary to have a certain amount of clearance at the vane end faces in order to prevent the possibility of binding of the vanes when the various parts of the variable vane assembly are exposed to heating and cooling during operation of the turbocharger. Prior to the invention, such relatively substantial clearances resulted in significant turbine efficiency losses, which are particularly problematic when the vanes are in their closed position (i.e., rotated to a position in which the flow passages between the vanes have a minimum flow area).

Figure 3:
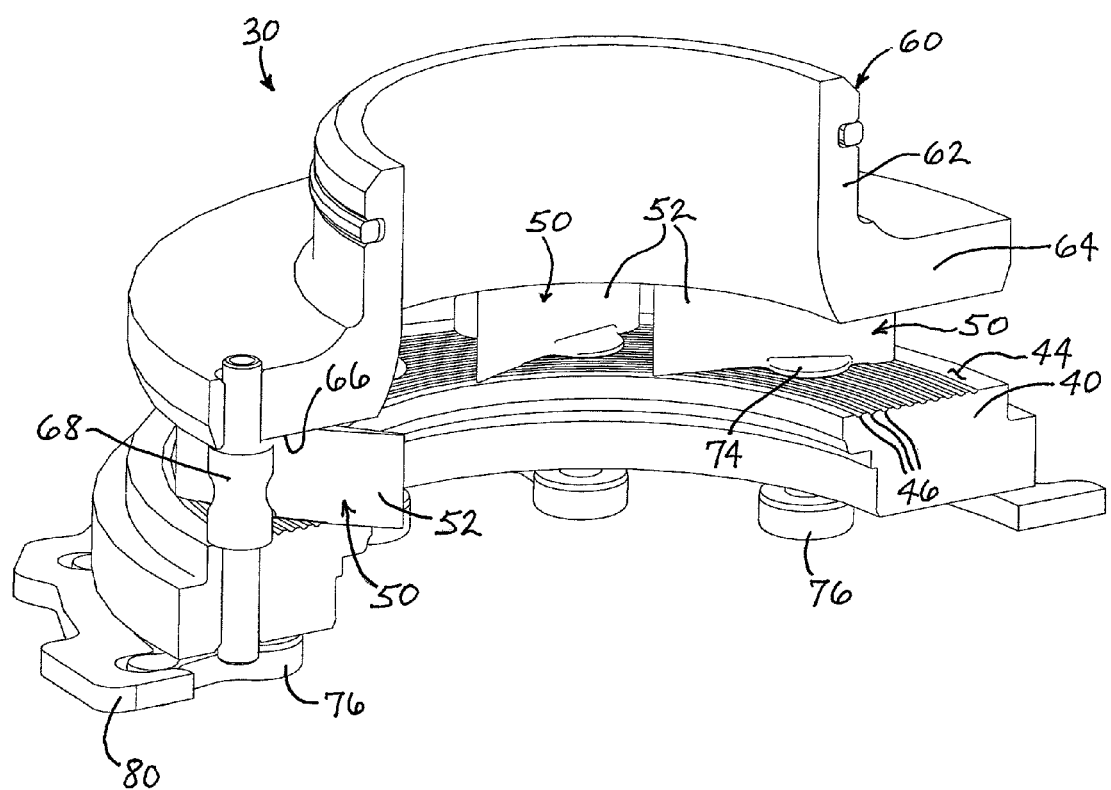
FIG. 3 is a perspective view of the variable nozzle of FIG. 2, but sectioned in half.

In accordance with the present invention, the clearance-induced efficiency losses can be substantially reduced or eliminated, as now explained with primary reference to FIGS. 3 through 5. Specifically, the face 44 of the nozzle ring 40 adjacent the end faces 54 of the vanes 50 is provided with a plurality of generally parallel spaced-apart grooves 46. Each of the grooves 46 has its lengthwise direction oriented generally perpendicular to the direction in which the exhaust gas is flowing through the passages between adjacent vanes 50. Consequently, any leakage flow that passes between the ends of the vanes and the nozzle ring face 44 (which proceeds substantially in the general flow direction) travels substantially transverse to the lengthwise direction of each groove.

Accordingly, the grooves 46 and the adjacent end face 54 of each vane together define a labyrinthine passage through which the leakage flow must pass. The labyrinthine passage presents a greater flow resistance than would be the case if the grooves were not present in the nozzle face. Accordingly, for a given pressure differential across the vane airfoil, the labyrinthine passage will permit a smaller leakage flow rate than would be the case without the grooves. This reduction in leakage flow has a beneficial impact on turbine efficiency.

In one embodiment, the grooves 46 are confined to a region of the face 44 of the nozzle ring 40 substantially coinciding with a radial extent of the vanes 50 in the open position thereof. FIG. 4 shows the vanes 50 in their open position (in which the vanes have their greatest radial extent), and it can be seen that the plurality of grooves 46 extend all the way from the leading edge to the trailing edge of each vane.

Alternatively, however, the grooves 46 could be confined to a smaller radial extent of the nozzle ring face 44, such as an extent just sufficient to cover the full radial vane extent when the vanes are in their closed position where reducing leakage flow has the most-important impact on turbine efficiency.

Figure 7:
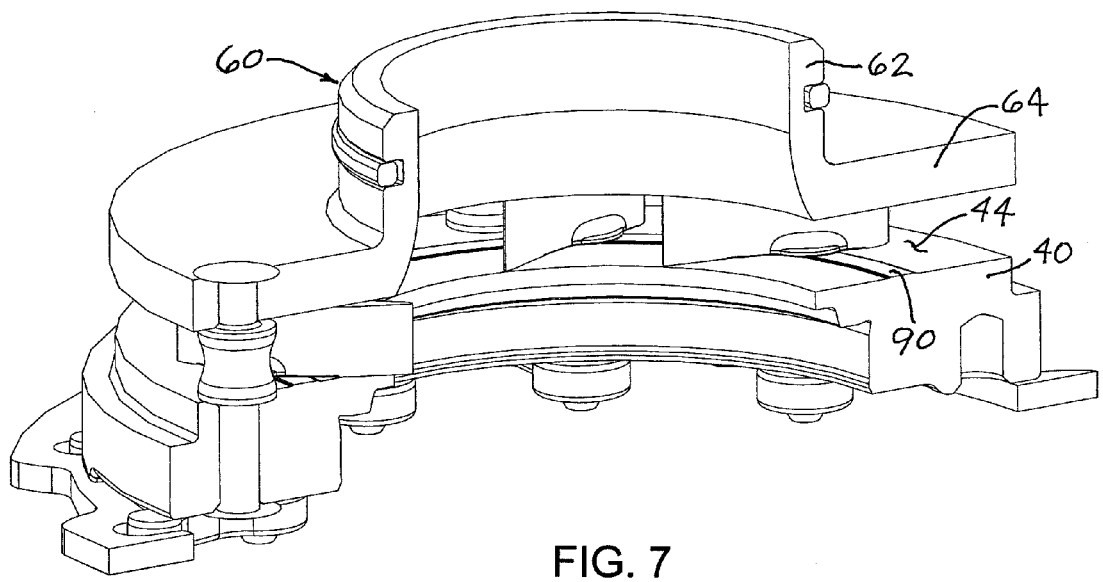
FIG. 7 is perspective view of a variable nozzle, sectioned in half, in accordance with a further embodiment of the invention.
Figure 8:
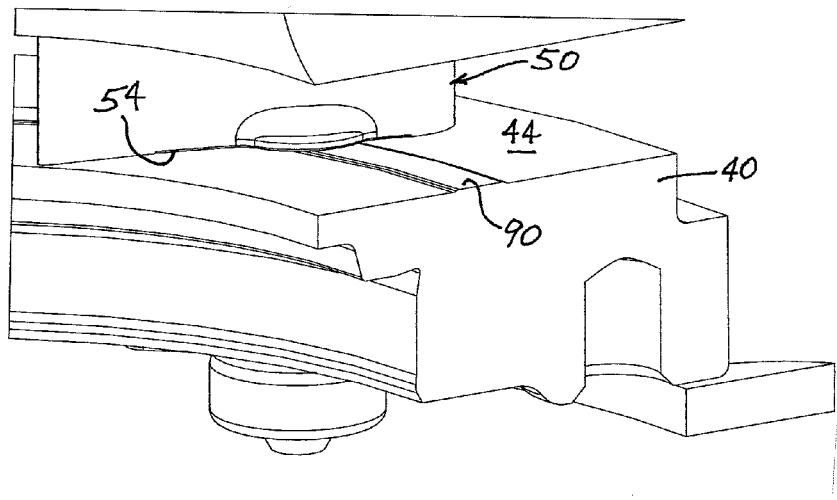
FIG. 8 is an enlarged portion of FIG. 7.

As illustrated in FIGS. 7 and 8, in an alternative embodiment the nozzle ring face 44 is provided with a raised boss 90 (i.e., a region projecting axially farther toward the opposite nozzle wall 66 than the rest of the face 44) in a ring-shaped configuration. The boss 90 can be confined to a region of the nozzle ring face generally corresponding to the locations of the bearing portions 74 of the axles 70, and the radial extent of the boss can substantially coincide with that of the vanes in their closed position where, as noted, leakage flow has the most-serious impact on turbine efficiency. The boss 90 has a height sufficient to substantially fill up the clearance that otherwise would exist between the end faces 54 of the vanes 50 and the nozzle ring face 44 in the closed position of the vanes. Accordingly, the boss 90 substantially reduces or eliminates leakage flow past the vane ends in the closed position of the vanes.

The face of the boss 90 could be provided with grooves, similar to the grooves 46 of the previous embodiment, in order to create a labyrinthine flow passage and further reduce leakage flow.

Figure 9:
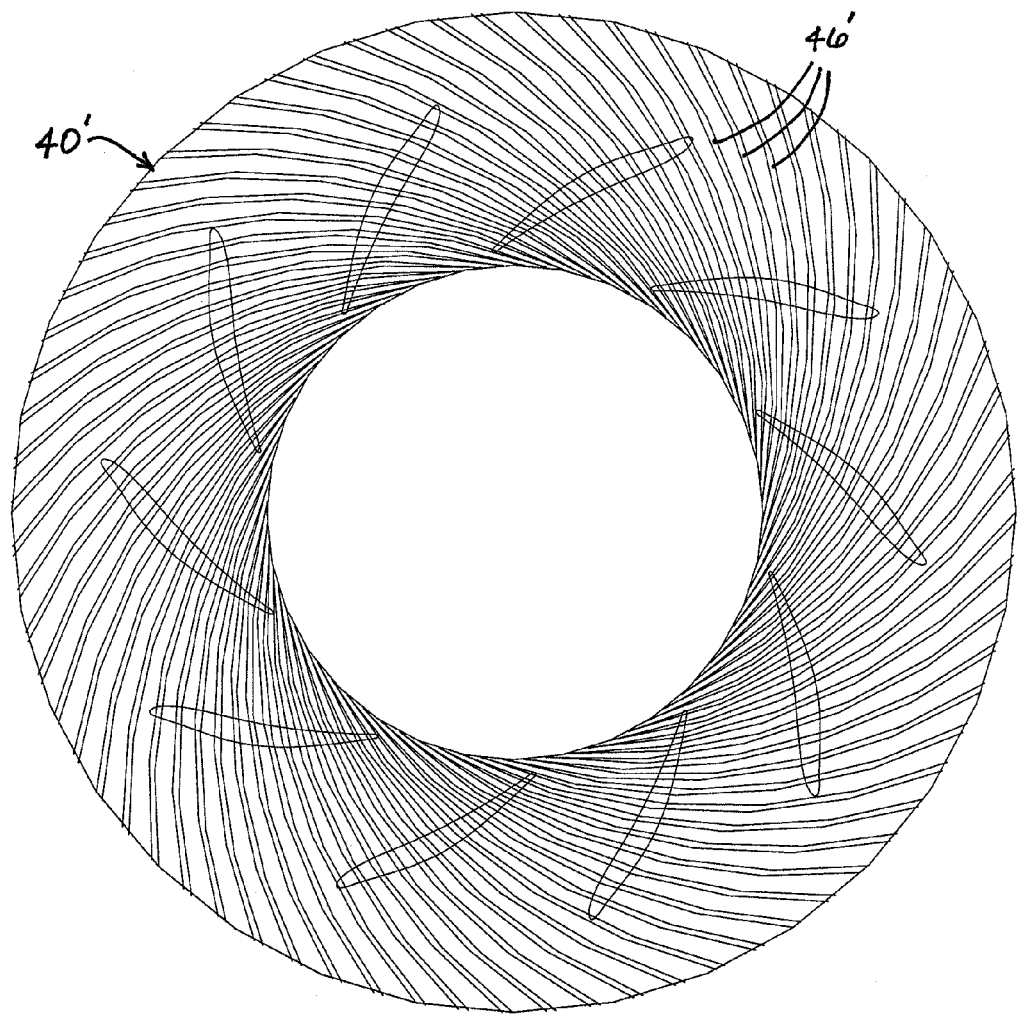
FIG. 9 is a schematic view of a nozzle ring, with superimposed vanes, showing an alternative configuration of grooves in accordance with another embodiment of the invention.

In any of the embodiments of the invention, the grooves 46 can take on a variety of configurations. As noted, the lengthwise direction of the grooves can be perpendicular to the flow direction. Since the flow direction changes through the passages between the vanes, however, a constant groove orientation cannot maintain the desired perpendicular relationship over the entire vane passage. FIG. 9 is an example of a more-complex groove configuration designed to more-closely maintain the perpendicular relationship throughout the entire vane passage. As shown, the orientation of the grooves 46' is not constant. The grooves 46' have their lengthwise directions oriented closer to radial at the entrance of each vane passage, and oriented closer to circumferential at the exit of the vane passage. This allows the grooves to be substantially perpendicular to the flow direction throughout the passage. It will be understood, of course, that this substantially perpendicular relationship cannot be maintained for all operating conditions, since the vane setting angles will vary with operating condition. Accordingly, the groove configuration can be chosen to be optimum at a particular operating condition or vane setting angle of interest, such as the fully closed vane position where leakage flow may have a particularly significant effect on turbine efficiency.

Other groove configurations are also possible. As another example, the grooves can generally conform to the outer profiles of the vanes.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A variable nozzle for a turbocharger, comprising:
a generally annular nozzle ring defining a plurality of circumferentially spaced bearing apertures extending axially through an axially facing face of the nozzle ring;
a nozzle wall defining a face axially spaced from and opposing the face of the nozzle ring, a nozzle flow path being defined between the opposing faces of the nozzle ring and nozzle wall; and
a plurality of circumferentially spaced vanes disposed in the nozzle flow path, each vane comprising an axle defining a pivot axis for the vane, the axles of the vanes being respectively received in the bearing apertures of the nozzle ring and being rotatable therein about the respective pivot axes such that the vanes are adjustable in setting angle between a closed position and an open position, each vane including an aerodynamic airfoil portion having an outer airfoil surface, each airfoil portion being joined to the respective axle and extending along the pivot axis from a first end to an opposite second end, the first and second ends of each airfoil portion respectively defining first and second end faces that are substantially perpendicular to the pivot axis, clearances existing between the first end faces of the airfoil portions and the face of the nozzle ring and between the second end faces of the airfoil portions and the face of the nozzle wall;
wherein at least the face of the nozzle ring includes a plurality of generally parallel spaced-apart grooves positioned proximate the respective end faces of the airfoil portions of the vanes, the grooves and the adjacent end face of each vane together defining a labyrinthine passage through which any leakage flow must pass.

2. The variable nozzle of claim 1, wherein the grooves are confined to a region of the face of the nozzle ring substantially coinciding with a radial extent of the vanes in the open position thereof.

3. The variable nozzle of claim 1, wherein the grooves are confined to a region of the face of the nozzle ring substantially coinciding with a radial extent of the vanes in the closed position thereof.

4. The variable nozzle of claim 1, wherein a lengthwise direction of the grooves is oriented generally perpendicular to a flow direction of the exhaust gas between the vanes.

5. A variable nozzle for a turbocharger, comprising:
a generally annular nozzle ring defining a plurality of circumferentially spaced bearing apertures extending axially through an axially facing face of the nozzle ring;
a nozzle wall defining a face axially spaced from and opposing the face of the nozzle ring, a nozzle flow path being defined between the opposing faces of the nozzle ring and nozzle wall; and
a plurality of circumferentially spaced vanes disposed in the nozzle flow path, each vane comprising an axle defining a pivot axis for the vane, the axles of the vanes being respectively received in the bearing apertures of the nozzle ring and being rotatable therein about the respective pivot axes such that the vanes are adjustable in setting angle between a closed position and an open position, each vane including an aerodynamic airfoil portion having an outer airfoil surface, each airfoil portion being joined to the respective axle and extending along the pivot axis from a first end to an opposite second end, the first and second ends of each airfoil portion respectively defining first and second end faces that are substantially perpendicular to the pivot axis, clearances existing between the first end faces of the airfoil portions and the face of the nozzle ring and between the second end faces of the airfoil portions and the face of the nozzle wall;

wherein the face of the nozzle ring includes a raised boss having a ring-shaped configuration, the boss having a radial extent substantially coinciding with that of the vanes in the closed position thereof, the boss substantially filling up the clearance that otherwise would exist between the face of the nozzle ring and the end faces of the vanes in the closed position of the vanes.

6. A turbocharger comprising:

a turbine wheel disposed within a turbine housing, the turbine housing defining an axially extending bore and a generally annular chamber surrounding the bore for receiving exhaust gas from an internal combustion engine; and a variable nozzle comprising:

a generally annular nozzle ring defining a plurality of circumferentially spaced bearing apertures extending axially through an axially facing face of the nozzle ring;

a nozzle wall defining a face axially spaced from and opposing the face of the nozzle ring, a nozzle flow path being defined between the opposing faces of the nozzle ring and nozzle wall, the chamber of the turbine housing being in fluid communication with the nozzle flow path; and a plurality of circumferentially spaced vanes disposed in the nozzle flow path, each vane comprising an axle defining a pivot axis for the vane, the axles of the vanes being respectively received in the bearing apertures of the nozzle ring and being rotatable therein about the respective pivot axes such that the vanes are adjustable in setting angle between a closed position and an open position, each vane including an aerodynamic airfoil portion having an outer airfoil surface, each airfoil portion being joined to the respective axle and extending along the pivot axis from a first end to an opposite second end, the first and second ends of each airfoil portion respectively defining first and second end faces that are substantially perpendicular to the pivot axis, clearances existing between the first end faces of the airfoil portions and the face of the nozzle ring and between the second end faces of the airfoil portions and the face of the nozzle wall;

wherein at least one of the faces of the nozzle ring and nozzle wall includes a plurality of generally parallel spaced-apart grooves positioned proximate the respective end face(s) of the airfoil portions of the vanes, the grooves and the adjacent end face of each vane together defining a labyrinthine passage through which any leakage flow must pass.

7. The turbocharger of claim 6, wherein the grooves are confined to a region of the face of the nozzle ring substantially coinciding with a radial extent of the vanes in the open position thereof.

8. The turbocharger of claim 6, wherein the grooves are confined to a region of the face of the nozzle ring substantially coinciding with a radial extent of the vanes in the closed position thereof.

9. The turbocharger of claim 6, wherein a lengthwise direction of the grooves is oriented generally perpendicular to a flow direction of the exhaust gas between the vanes.

* * * * *